United States Patent
Rink et al.

[11] Patent Number: 5,931,495
[45] Date of Patent: *Aug. 3, 1999

[54] IGNITION SYSTEM FOR A FLUID-FUELED INFLATOR

[75] Inventors: Karl K. Rink, Liberty; David J. Green, Brigham City, both of Utah

[73] Assignee: Autoliv ASP, Inc., Ogden, Utah

[*] Notice: This patent is subject to a terminal disclaimer.

[21] Appl. No.: 08/837,171

[22] Filed: Apr. 14, 1997

Related U.S. Application Data

[63] Continuation-in-part of application No. 08/565,331, Nov. 30, 1995, Pat. No. 5,649,720.

[51] Int. Cl.$^6$ .................................................. B60R 21/26
[52] U.S. Cl. ................ 280/737; 280/741; 222/5
[58] Field of Search .................... 280/737, 736, 280/741, 740, 742; 222/5; 137/68.13, 68.3

[56] References Cited

U.S. PATENT DOCUMENTS

| | | | |
|---|---|---|---|
| 5,060,973 | 10/1991 | Giovanetti | 280/736 |
| 5,131,680 | 7/1992 | Coultas et al. | 280/737 |
| 5,257,819 | 11/1993 | Frantom et al. | 280/737 |
| 5,263,740 | 11/1993 | Frey et al. | 280/737 |
| 5,330,730 | 7/1994 | Brede et al. | 280/737 |
| 5,344,186 | 9/1994 | Bergerson et al. | 280/741 |
| 5,470,104 | 11/1995 | Smith et al. | 280/737 |
| 5,487,561 | 1/1996 | Mandzy et al. | 280/736 |
| 5,601,310 | 2/1997 | Di Giacomo et al. | 280/736 |

FOREIGN PATENT DOCUMENTS

| | | | |
|---|---|---|---|
| 0601489 | 6/1994 | European Pat. Off. | |
| 94/26563 | 11/1994 | WIPO | 280/736 |

OTHER PUBLICATIONS

U.S. Patent Application Serial No. 08/565,331, filed Nov. 30, 1995, Rink et al.

*Primary Examiner*—Peter C. English
*Attorney, Agent, or Firm*—Sally J. Brown

[57] ABSTRACT

An improved ignition system for inflators such as those used in airbag passive restraint systems is disclosed. A breakable seal is provided in a storage chamber for a combustible fluid. Upon activation of an initiator the breakable seal is opened and the combustible fluid flows from the storage chamber into a combustion chamber where it is ignited to provide an enhanced volume of heated gas. The heated gas may be used either to directly inflate an associated inflatable apparatus or it may be used to first heat a further compressed gas and the combined gases used to inflate an inflatable apparatus. The breakable seal may be opened by a piston driven plunger. The design of the components of the ignition system provides control over the inflation characteristics.

5 Claims, 4 Drawing Sheets

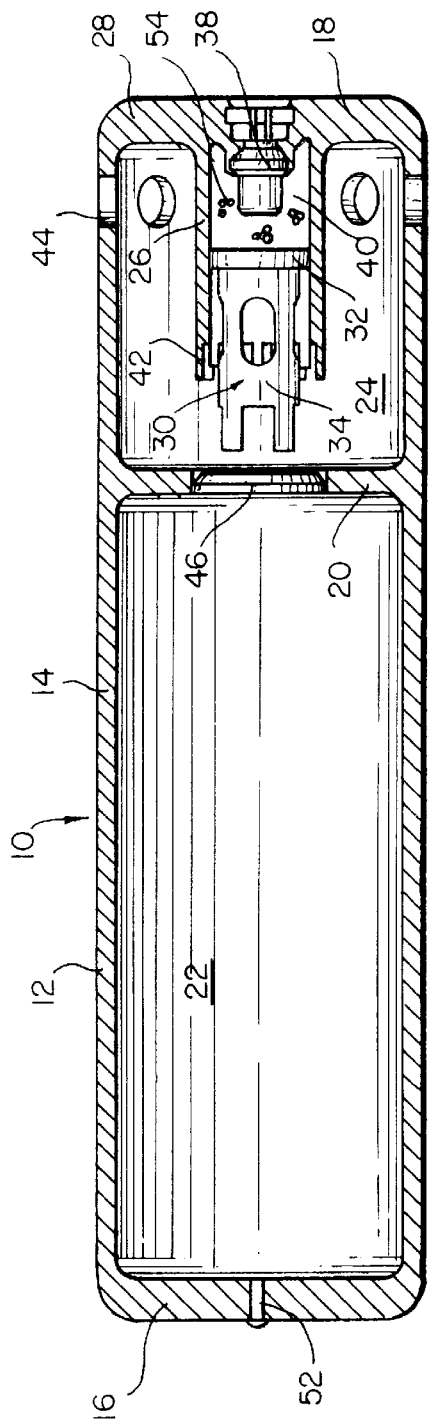
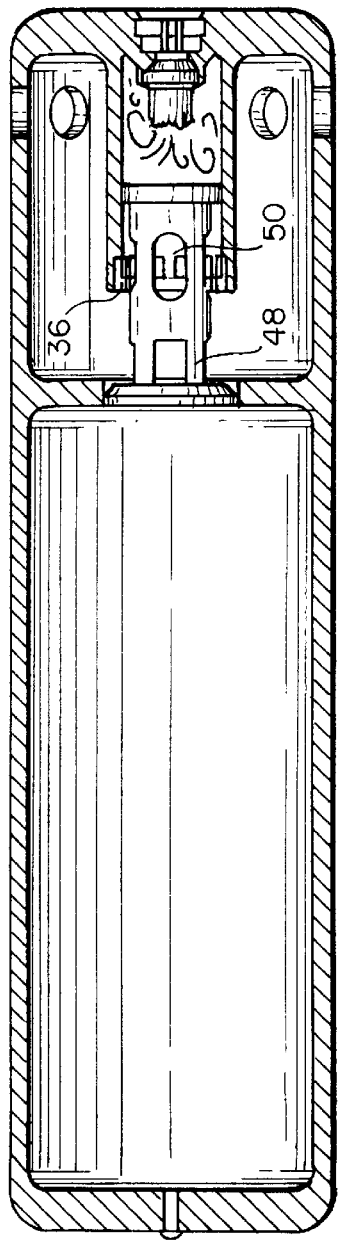

IGNITION SYSTEM FOR A FLUID-FUELED INFLATOR

CROSS REFERENCE TO RELATED APPLICATION

This application is a continuation-in-part of application Ser. No. 08/565,331, filed on Nov. 30, 1995, U.S. Pat. No. 5,649,720, by Karl K. Rink, David J. Green and Guy R. Letendre.

BACKGROUND OF THE INVENTION

1. Field of the Invention

The present invention provides an improved system for igniting inflators which provide a quantity of gas sufficient to inflate an associated inflatable apparatus by the combustion, or exothermic decomposition, of a fluid fuel or a fluid decomposable material. The invention has particular application in fluid-fueled inflators used to inflate the airbag, or cushion, of the passive restraint systems used in vehicles and commonly referred to as airbags.

2. Description of Related Art

Many types of inflator devices for inflating the airbag/cushion in airbag systems have been disclosed. Such inflators should be capable of releasing a sufficient quantity of a non-toxic gas to inflate the airbag cushion in a very short period of time. Additionally, the inflator needs to provide a high degree of reliability over the extended temperature range in which modern vehicles are expected to operate, and over the expected extended lifetime of the vehicle, typically fifteen years.

One of the earliest disclosed inflator designs relies on a stored compressed gas which is released to inflate the airbag. Another design relies on the ignition of a solid gas generating pyrotechnic material to produce a sufficient quantity of gas to inflate the airbag. A third type of inflator relies on the combination of a stored inert compressed gas which is heated and augmented by the gases resulting from the combustion of a solid gas generating material. While these designs are functional to provide the gas needed to inflate an airbag, they each have disadvantages. The designs which rely on a compressed gas must provide a relatively strong gas storage container, the relatively thick walls of which increase the weight and bulk of the airbag assembly, a concern to vehicle manufacturers who generally seek to minimize the weight of their vehicles. The designs which rely on the ignition of a solid gas generant material usually result in a generated gas which contains solid particulate material at a sufficiently elevated temperature that it requires further conditioning, such as filtering and cooling, before it encounters either the fabric cushion of the airbag assembly or the occupants of the vehicle it is intended to protect.

Some of the more recent inflator designs rely on fluid fuels and oxidants which, in addition to having lower manufacturing costs, offer advantages such as, inter alia, they can be provided at relatively low temperatures with relatively low concentrations of incomplete products of combustion and they produce cleaner generated gases which contain little or no solid particulate matter. Some of these designs are more fully described in U.S. Pat. No. 5,470,104, entitled FLUID FUELED AIR BAG INFLATOR, filed by Bradley W. Smith and Karl K. Rink, and commonly assigned with this application. U.S. Pat. No. 5,470,104 is hereby incorporated by reference.

One type of fluid fueled inflator which stores a mixture of a gaseous fuel with a gaseous oxidizer in a porous matrix is described in Parent U.S. patent application Ser. No. 08/565,331, entitled INFLATORS WHICH STORE PREMIXED FLUID FUEL AND OXIDIZER IN A POROUS MATRIX, filed by Karl K. Rink, David J. Green and Guy R. Letendre, and commonly assigned with this application. The present ignition system was conceived in enhancing the development of the invention in Ser. No. 08/565,331. The present ignition system, however, has a broader utility inasmuch as it can be used with fluid fueled inflators other than those which incorporate the porous matrix storage structure, and to which the Ser. No. 08/565,331 application is directed. Application Ser. No. 08/565,331 is hereby incorporated by reference.

It is an object of the present invention to provide a fluid fueled inflator wherein the inflation characteristics can be controlled to provide for a less aggressive opening of the airbag cushion.

It is a further object of the invention to provide an inflator wherein the physical dimensions of certain components thereof can be modified to tune or tailor the inflation characteristics of the product gases.

It is also an object of the present invention to provide a fluid fueled inflator wherein the fuel is combusted as it flows through a combustion chamber which is separate from the chamber in which it is stored.

It is a further object to provide an inflator wherein a fluid combustible material can be reliably stored for an extended period of time and can be reliably released and ignited when signaled by an activating device such as a crash sensor.

SUMMARY OF THE INVENTION

The present invention is directed to improving the design of known fluid fueled inflators whereby structural characteristics are provided which regulate the procedure whereby the fluid fuel is initially released and ignited. The new ignition system allows the flammable components to be held safely over the expected lifetime of the vehicle while also providing for the components to be reliably and controllably released and ignited when the inflator is ignited.

The invention involves producing an inflation gas by igniting a combustible fluid as it flows into and through a combustion chamber wherein only a portion of the stored fluid is ignited at a given time. The fluid flows into the combustion chamber from a storage chamber through an opening. The mass flow rate of the fluid is controlled by controlling the size of that opening and, optionally, controlling the size of the openings through which the generated gas exits the combustion zone. The opening can be produced by a piston driven plunger, wherein the ignition products of a squib type initiator initially drive the piston and subsequently ignite the combustible gas as it flows through the combustion chamber.

BRIEF DESCRIPTION OF THE DRAWINGS

FIG. 1 is a cross section view of an inflator according to this invention in its static, or storage, condition.

FIG. 2 is a further view of the inflator of FIG. 1 showing the position of its components shortly after activation.

DETAILED DESCRIPTION OF THE INVENTION

Figure 3:
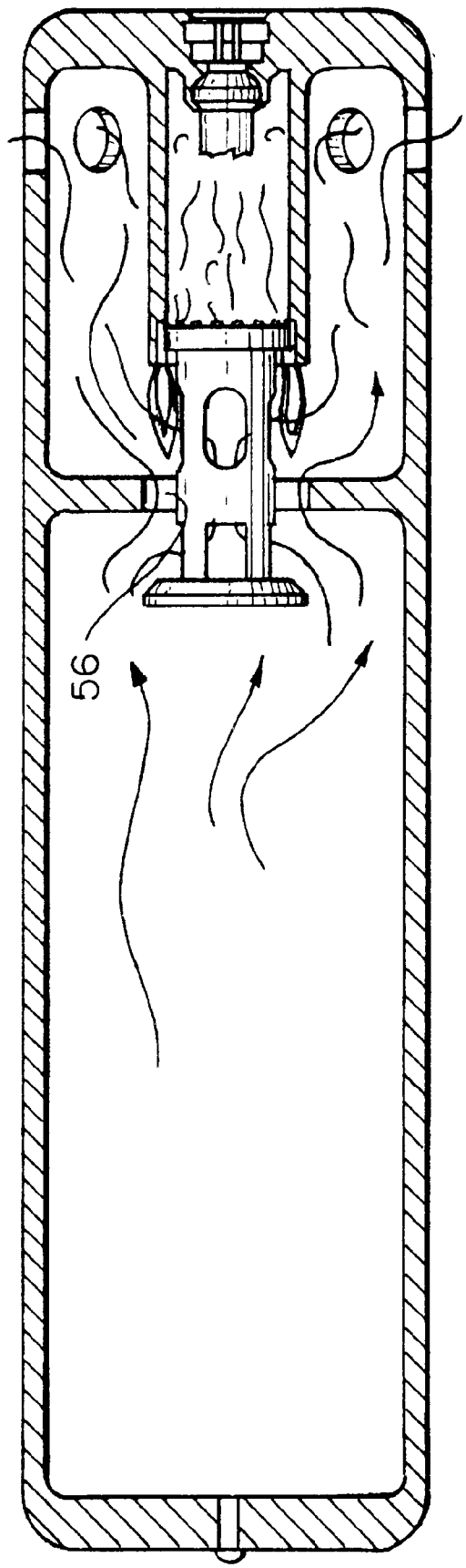
FIG. 3 is a further view of the inflator of FIG. 1 showing the position of its components after it has completely functioned.
Figure 4:
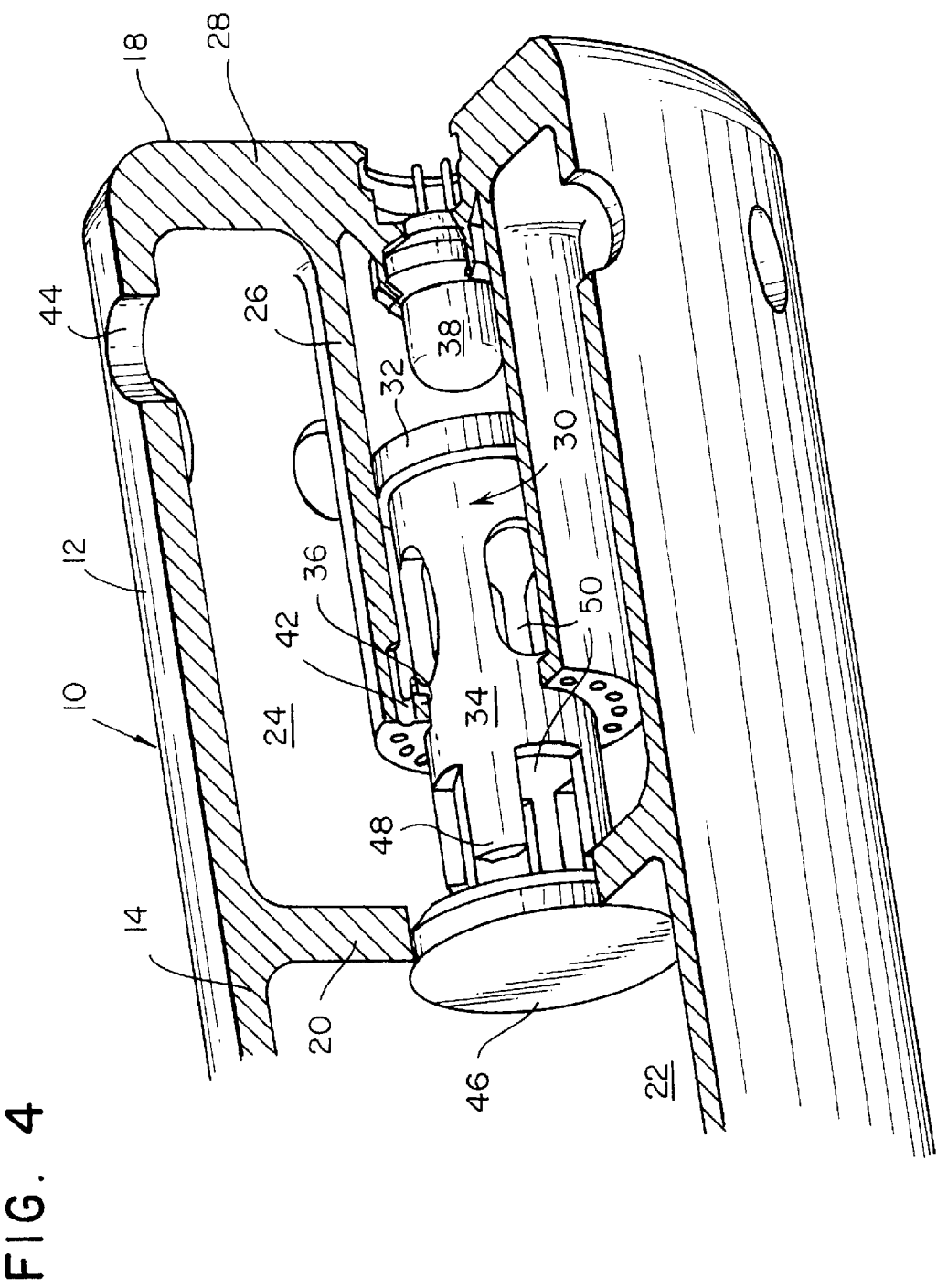
FIG. 4 is a perspective view, partially in section, of the ignition components of the FIG. 1 inflator.

An inflator having the improved ignition system of the present invention is illustrated at various stages of its operation in FIGS. 1 through 3. An expanded perspective view of the combustion chamber and the ignition system components of the same inflator is illustrated in FIG. 4. The inflator 10 comprises a housing 12 having a side wall 14 extending from a first closed end 16 to a second end 18. A bulkhead 20 extends from the side wall 14 dividing the interior of the housing into two chambers, a storage chamber 22 and a combustion chamber 24. A cylindrical piston sleeve 26 extends into the combustion chamber 24 from the end wall 28 at the second end 18. A piston 30 comprising a piston head 32 and a cylindrical piston plunger 34 is mounted so that it can slide in the piston sleeve 26. The piston sleeve 26 includes a stop 36 designed to stop the piston head 32 before it completely exits the piston sleeve 26. An initiator 38, such as an electrically actuated squib, is mounted through the end wall 28. The firing end of the initiator extends into an ignition cavity 40 defined by the cylindrical piston sleeve 26 and the piston head 32. The piston sleeve includes a number of small grooves and/or orifices 42 at or adjacent the stop 36 which provide fluid communication between the ignition cavity 40 and the combustion chamber 24 when the piston head 32 is at or nearing engagement with the stop 36. Exit ports 44 are equally spaced about the side wall 14 adjacent to the second end 18, whereby the produced inflator gases can be routed from the combustion chamber 24 to the associated inflatable cushion (not shown). The exit ports 44 are equally spaced about the circumference of the side wall 14 to equalize the thrust produced as a reaction to the escaping gas, whereby a zero thrust situation is maintained. An openable hermetic seal 46 is provided at a location in the bulkhead which is aligned with the piston plunger 34. The seal 46 can be any of a number of structures which will open or burst when struck by the piston plunger 34. The seal 46 can be a burst disc, a thin region of the bulkhead, or a region of the bulkhead defined by a weakened perimeter formed by such as a scored line on its surface. The piston plunger is provided with prongs 48 designed to contact the seal 46 and a series of ports 50 or other openings capable of providing fluid communication between the exterior and the interior of the cylindrical tubular piston plunger 34 at different locations along its length. A fluid combustible material is provided in the storage chamber 22 through a fill port provided at any convenient place in the wall of that chamber; in the illustrated device the fill port 52 is provided in the end wall of the storage chamber 22. A pyrotechnic or other combustible material 54 may be provided in the ignition cavity 40 adjacent the squib 38.

The inflater as illustrated in FIG. 1 is in its static or storage condition. In FIG. 2, it is illustrated as the initiator functions. FIG. 3 illustrates the inflator in a fully functioned condition. When the initiator 38 receives an activation signal from a crash sensor, not shown, it fires into the ignition cavity 40 thereby igniting the pyrotechnic or other combustible material 54 provided in that cavity. The ignition products produced by such ignition act on the piston head 32 causing the piston to slide in the piston sleeve 26 toward the hermetic seal 46. As the piston 30 advances, the prongs 48 thereon contact the hermetic seal 46, as illustrated in FIG. 2, and as the piston continues its advance the hermetic seal is broken and forced into the storage chamber 22, as illustrated in FIG. 3. Upon breakage of the hermetic seal 46, the combustible fluid stored under pressure begins to exit from the storage chamber 22 into the combustion chamber 24 through the opening 56 in the bulkhead 20 resulting from the breakage and dislocation of the hermetic seal. When the piston head 32 advances past the grooves/orifices 42, fluid communication between the ignition cavity 40 and the combustion chamber 24 is established and the ignition products begin to flow from the ignition cavity into the combustion chamber where they contact and ignite the combustible fluid as it feeds into the combustion chamber from the storage chamber. The ignited combustible fluid rapidly produces a heated product gas having a greatly enhanced effective volume which passes from the inflator through exit ports 44 and can then be directed to the inflatable cushion of an airbag system (not shown) or some other inflatable apparatus.

The combustible fluid provided in the storage chamber can be a mixture of a fluid fuel with a fluid oxidant, a fluid monopropellant, or a fluid material which exothermically decomposes or dissociates. The useful fluid fuels include a wide range of gases or vapors, including liquified gases, such as hydrogen and hydrocarbons including ethane, propane and butane. Liquid fuels can also be used, however their use requires additional means, such as a spring biased piston, to maintain the liquid in the storage chamber at a sufficient pressure to assure that the liquid fuel will continue to flow from the storage chamber to the combustion chamber until the storage chamber is essentially exhausted of the liquid fuel. Fluid oxidants to be used in admixture with the fluid fuels include nitrous oxide ($N_2O$) and various oxygen containing gases such as pure oxygen, air, diluted air and mixtures of oxygen with one or more inert diluent gases, including nitrogen, carbon dioxide, helium, argon, xenon and krypton. A small amount of helium is often provided for its enhanced detectability during leak testing. Useful combustible fluids which exothermically decompose include nitrous oxide ($N_2O$), acetylene, certain organic peroxides and hydrazine. The combustible fluid may also contain a limited amount, less than about 10%, of water.

Combustible gases or liquified gases are preferably provided in the storage chamber 22 at a pressure in the range of 500 psi to 4000 psi (3.4 to 27.6 MPa), preferably 1500 psi to 3500 psi (10.3 to 24.1 MPa). The storage chamber 22 may contain a porous matrix in which the combustible fluid is stored, but is freely discharged upon activation of the inflator, as is more fully described in the incorporated application Ser. No. 08/565,331.

For a passenger side airbag system, the storage chamber volume will typically be between about 15 in.$^3$ and 30 in$^3$ (246 c.c. to 492 c.c.). For a driver side airbag system the storage volume will be in the range of 2.5 in.$^3$ to 10 in.$^3$ (41 c.c. to 164 c.c.). A side impact airbag system will typically require a storage chamber volume between 0.5 in.$^3$ and 2.5 in.$^3$ (8.2 c.c. to 41 c.c.).

The ignition products produced by the initiator 38, together with the pyrotechnic or other combustible material provided in the ignition cavity 40, should provide sufficient energy to force the piston through a full stroke whereby it engages and is stopped by the stop 36, and provide sufficient residual heat/energy to ignite the combustible fluid as it passes through the combustion chamber 24. While many combustible materials can function to provide the required energy output, pyrotechnic materials, such as boron potassium nitrate ($BKNO_3$), zirconium potassium perchlorate (ZPP) and thermites, not only provide the required energy input, they also result in hot solid particulates in the ignition products. The hot particulates enhance the reliability of the ignition of combustible fluid in the combustion chamber.

The present ignition system provides for reliable ignition and combustion of the combustible fluid as it passes into a combustion chamber from a separate storage chamber. Most of the prior art fluid fueled inflators provide for ignition and combustion of the combustible fluid to take place in the chamber in which it is stored Such prior art systems typically result in extremely rapid ignition and combustion of the combustible fluid which requires a relatively heavy storage/combustion chamber, a relatively strong module and a relatively strong airbag cushion, in order to assure that they are capable of containing the rapid and extreme pressure rise which accompanies such rapid ignition. Such an aggressive inflation onset also produces a relatively hard cushion which results in a heavy "bag slap" when it contacts the vehicle occupant it is intended to protect.

The present invention provides structure which can be tuned to control the ignition characteristics of the inflator, and thereby, the inflation characteristics of the airbag cushion. Specifically, the ignition characteristics can be controlled by controlling (a) the mass flow rate at which the combustible fluid passes from the storage chamber 22 into the combustion chamber 24, and (b) the timing of the initial ignition of the combustible material. The mass flow rate at which the combustible fluid passes between chambers is governed by (a) the effective flow cross section of the opening 56 provided in the bulkhead 20 when the hermetic seal 46 is displaced and (b) the pressure differential between the storage chamber and the combustion chamber. The effective flow cross section is established by the cross-sectional area of the opening less that portion of that cross-sectional area occupied by the piston plunger 34 and not otherwise made available for combustible fluid flow by ports 50 and an interior passage in the tubular piston plunger 34. If the clearance between the side of the opening 56 and the piston plunger 34 is relatively small, the size and location of the plunger ports 50 and the interior passage provide the principal means of controlling the effective flow cross section. Alternatively, the plunger can be provided without the ports 50 and interior passage, whereby the fuel flow will be controlled solely by the clearance between the plunger 34 and the opening 56. The prongs 48 of the plunger may be tapered or bent inwardly so that they extend in converging directions, whereby they present a tapered or conical leading edge of the piston plunger 34 as it enters the opening 56 and enhances the proper alignment of the piston plunger in the opening 56. By controlling both the rate of flow of the combustible fluid into the combustion zone and the rate at which the generated gas is discharged from the combustion zone, by controlling the number and size of the exit ports 44, the combustion of the combustible fluid can be regulated to vary the strength and duration of the generated inflation gas flow. Such control can be applied to assure that the inflator does not produce as high a maximum pressure as would be created by virtually instantaneous ignition and combustion. Accordingly, the inflator structure, the airbag module and the airbag cushion can be designed to contain a smaller maximum pressure, and, therefore, do not need to be as heavily constructed as would be required in inflators where ignition and combustion occur virtually instantaneously.

The inflation characteristics are further controlled by controlling the timing of the initial ignition of the combustible fluid. Such control is achieved by adjusting the initial distance between the end of the prongs 48 and the hermetic seal 46 and by adjusting the size, number and length of the grooves 42. By providing a short distance between the end of prongs 48 and the hermetic seal, the seal will be broken relatively early in the ignition sequence, allowing the gas to begin to flow into the combustion chamber relatively early. By providing a relatively small size and number of grooves 42, the relatively small amount of ignition products supplied to the combustion zone result in a relatively less aggressive inflation onset. By providing longer grooves, which the piston exposes to the ignition products relatively early in its stroke, the ignition products are introduced into the combustion chamber relatively early in the ignition sequence. Accordingly, the improved ignition system provided by this invention permits tuning, or tailoring, of the ignition characteristics to provide for a greater or lesser amount of the gas to be present in the combustion chamber when it is initially ignited, as well as control over the rate at which gas is fed to the combustion chamber during the generation process. Accordingly, adjustment of the physical dimensions of the inflator components permits inflator designs having less aggressive rise rates and smaller maximum developed pressures.

When the breakable seal is initially opened, the stored gas begins to flow from the storage chamber 22 into the combustion chamber 24 where it contacts the squib's ignition products and is ignited. Generally, as long as the velocity of the gas flowing through the opening 56 is greater than the flame propagation speed of the ignited gas, the combustion reaction will be confined to the combustion chamber 24. If the pressure in the storage chamber is controlled solely by the inherent pressure of the stored gas, the pressure in the storage chamber will decrease as the gas drains from that chamber, causing a decrease in the pressure differential between the chambers. Eventually the pressure differential may decrease such that the velocity of gas flow through the opening 56 is no longer greater than the flame propagation speed of the ignited gas, at which point the combustion reaction may move, or flashback, into the storage chamber 22. While such flashback may provide a pressure surge, it occurs after the major portion of the initially stored gas has been discharged from the storage chamber and combusted in the combustion chamber. The gas remaining in the storage chamber when such flashback occurs should not be sufficient to produce a pressure surge that challenges the inflator's structural integrity.

Figure 5:
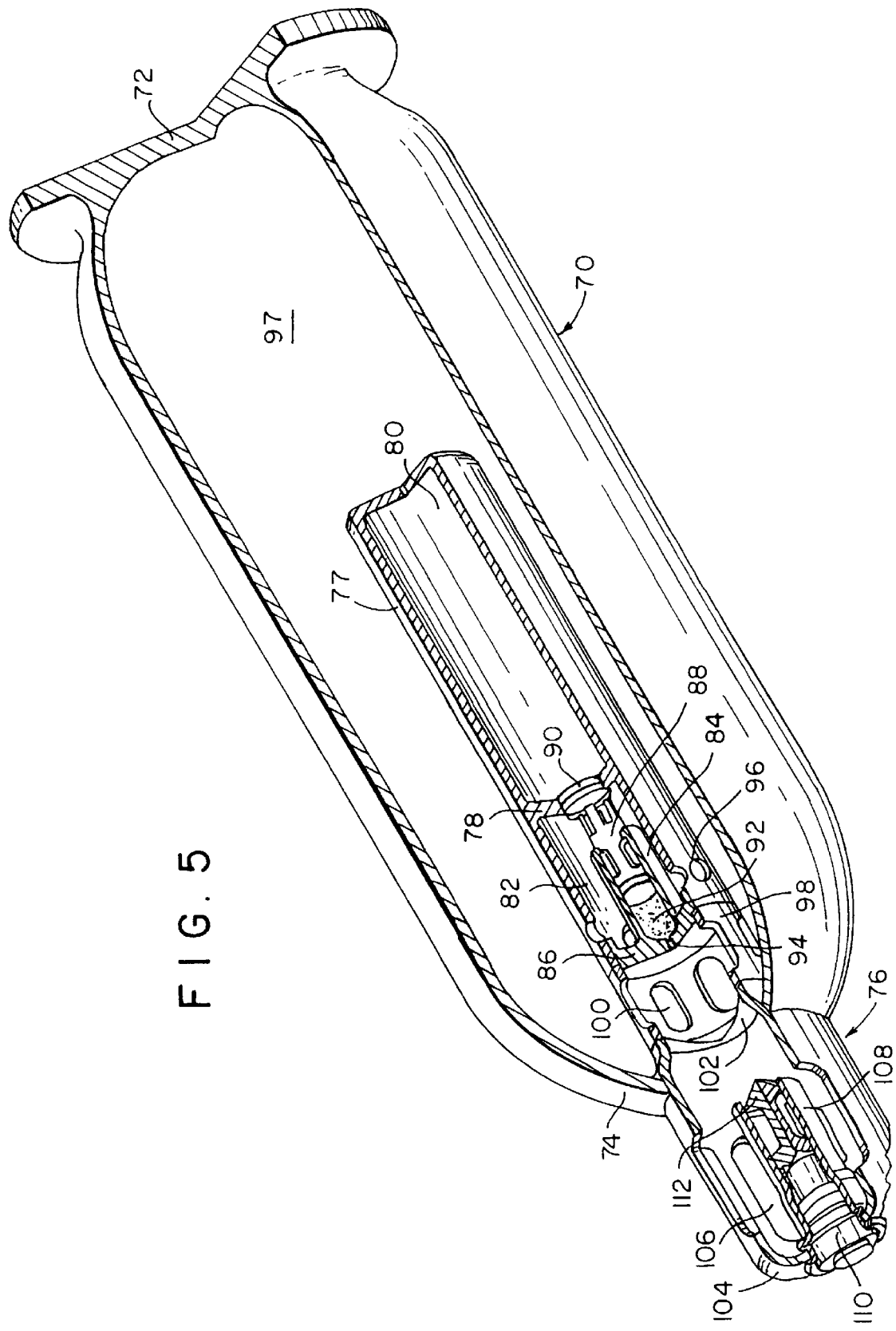
FIG. 5 is a perspective view, partially in section, of a further embodiment of an inflator according to the present invention.

The inventive ignition system can also be used in inflators which use the combustion of a fluid to heat a released compressed gas thereby providing an enhanced volume of product gas for use in inflatable apparatus. FIG. 5 illustrates such an inflator. This inflator comprises an elongated vessel 70 extending from a closed end 72 to a second end 74. A diffuser and combustion assembly 76 is mounted to partially extend into the vessel 70 at its second end 74. This assembly includes an elongated cylinder 77 wherein a bulkhead 78 separates storage chamber 80 from combustion chamber 82. A piston sleeve 84 extends into the combustion chamber 82 from end structure 86. A piston 88, located within the piston sleeve 84, is aligned with a hermetic seal closure 90 located on the bulkhead 78. A pyrotechnic or other combustible material is provided in a firing cavity 92 provided within the piston sleeve 84. The piston 88 and piston sleeve 84 are essentially similar to the piston 30 and piston sleeve 26 of the inflator illustrated in FIGS. 1 through 4 in that the sleeve includes a stop and grooves and orifices which direct ignition products into the combustion chamber, and the piston includes a piston head and a piston plunger, which in turn contains prongs and plunger ports. An impact sensitive primer 94 located in a recess provided in the end structure 86 is designed to fire into the firing cavity 92 through a channel leading from the recess into the cavity 92. Ports 96 are provided equidistantly around the combustion chamber 82 providing fluid communication for the combustion gases produced in the combustion chamber to pass into the chamber 97 occupying most of the interior of vessel 70. The elongated cylinder 77 is fixedly attached at its end structure 86 to a ported cylindrical coupling 98. Coupling 98 contains ports 100 equally spaced around its circumference and providing fluid communication between the chamber 97 and the interior of coupling 98. A burst disk 102 separates the coupling 98 from the diffuser housing 104. The diffuser housing contains diffuser ports 106 equally spaced around its circumference providing fluid communication between the interior of the diffuser and the exterior of the inflator. The diffuser housing 104 also provides the support for a barrel 108 extending along the interior axis of the housing. An initiator, such as a squib 110, is mounted at the exterior end of the barrel 108. A projectile 112 is mounted in the barrel so as to be projected through the burst disc 102 and against the impact sensitive primer 94 by the ignition products created when the squib 110 is activated. An optional booster charge of a propellant or other combustible material may be provided in the barrel 108 between the squib 110 and the projectile 112 in order to increase the propelling force applied to the projectile.

The storage chamber 80 contains a combustible fluid which can be selected from the combustible fluids described as suitable for use with the inflator of FIGS. 1 through 4. Similarly, the pyrotechnic or other combustible material provided in the firing cavity 92 can be the same as are disclosed for use in the preceding embodiment.

An auxiliary compressed gas is provided in chamber 97. The auxiliary compressed gas typically is an inert gas, such as nitrogen, argon, helium, krypton or xenon. Mixtures of these gases may also be used. In particular, the inclusion of helium with any of the other auxiliary gases is often desirable to improve the sensitivity of leak testing procedures. The auxiliary compressed gas is typically stored in the chamber 97 at a pressure in the range of 2000 to 4500 psi (13.8 MPa to 31.0 MPa)

Upon receiving an electrical signal from an activator, such as a crash sensor, the squib initiator 110 ignites releasing heated gas in the barrel 108, thereby propelling the projectile 112 through the burst disk 102 and against the primer 94. This striking of the primer 94 causes it to ignite and, in turn, ignite the pyrotechnic material in the firing cavity 92. The gases released by ignition of the pyrotechnic cause the piston 88 to open the hermetic seal closure 90. The combustible fluid in chamber 80 begins to flow into the combustion chamber 82 where it contacts and is ignited by the ignition products resulting from ignition of the pyrotechnic material and which have passed from the firing cavity 92 into the combustion chamber 82 through orifices provided in the piston sleeve 84. The combustion products pass from the combustion chamber 82 through ports 96 into chamber 97 where they mix with and heat the auxiliary compressed gas causing its effective volume to be substantially enhanced. The mixed gases then exit chamber 97 through ports 100, coupling 98 and the opened burst disk 102. The gases pass through diffuser housing 104 and exit the inflator through the diffuser ports 106 to be routed to an associated inflatable apparatus (not shown).

The preceding description is intended to provide a clear and complete description of the inventive inflator. No unnecessary limitations should be inferred from the description since modifications within the scope of the invention will be apparent to those of ordinary skill in the art. The scope of the invention is defined by the following claims.

We claim:

1. An inflator for producing gas capable of inflating an inflatable apparatus, comprising:

a storage chamber containing a fluid combustible material and defined, in part, by a breakable seal;

a combustion chamber separated from said storage chamber by said breakable seal;

an opening structure capable of opening said breakable seal comprising a piston arranged in a piston sleeve, said piston sleeve partially defining a cavity, said cavity containing a pyrotechnic material, and said piston sleeve directing the movement of said piston toward said breakable seal;

an initiator capable of causing said opening structure to break said breakable seal; and ignition structure capable of causing said combustible material to initially ignite in said combustion chamber, wherein said piston sleeve extends into said combustion chamber and said ignition structure comprises passages in said piston sleeve capable of providing fluid communication between said cavity and said combustion chamber after said piston has begun to move toward said breakable seal.

2. An inflator for producing gas capable of inflating an inflatable apparatus, comprising:

a storage chamber containing a fluid combustible material and defined, in part, by a breakable seal;

a combustion chamber separated from said storage chamber by said breakable seal;

an opening structure capable of opening said breakable seal comprising a piston arranged in a piston sleeve, said piston sleeve partially defining a cavity, said cavity containing a pyrotechnic material, and said piston sleeve directing the movement of said piston toward said breakable seal;

an initiator capable of causing said opening structure to break said breakable seal; and ignition structure capable of causing said combustible material to initially ignite in said combustion chamber, said ignition structure comprising a pressure sensitive primer capable of igniting said pyrotechnic material.

3. The inflator of claim 2, wherein:

said ignition structure further comprises a barrel extending from said initiator, and a projectile located within said barrell;

whereby activation of said initiator causes said projectile to be propelled toward said pressure sensitive primer resulting in said primer igniting said second combustible material.

4. The inflator of claim 2, further comprising an auxiliary storage chamber in fluid communication with said combustion chamber and containing a pressurized auxiliary gas.

5. The inflator of claim 4, wherein:

said auxiliary gas comprises a gas selected from the group consisting of nitrogen, argon, helium, krypton and xenon.

* * * * *